United States Patent
Sunnapu

(10) Patent No.: US 9,838,342 B2
(45) Date of Patent: Dec. 5, 2017

(54) NETWORK INTERFACE CONNECTION TEAMING SYSTEM

(71) Applicant: Dell Products L.P., Round Rock, TX (US)

(72) Inventor: Umesh Sunnapu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 361 days.

(21) Appl. No.: 13/895,177

(22) Filed: May 15, 2013

(65) Prior Publication Data

US 2014/0344478 A1    Nov. 20, 2014

(51) Int. Cl.
G06F 15/16 (2006.01)
H04L 12/861 (2013.01)
H04L 12/803 (2013.01)
H04L 12/24 (2006.01)

(52) U.S. Cl.
CPC ...... H04L 49/9068 (2013.01); H04L 41/0886 (2013.01); H04L 47/125 (2013.01)

(58) Field of Classification Search
CPC ... H04L 47/125; H04L 47/10; H04L 43/0817; H04L 41/065; H04L 43/0811; H04L 45/28; H04L 49/9068; H04L 41/0886; H04L 41/04; G06F 13/102
USPC ........ 709/220, 224, 250; 370/230, 235, 238, 370/252, 389, 390, 395.42, 401, 463
See application file for complete search history.

(56) References Cited

U.S. PATENT DOCUMENTS

| | | | |
|---|---|---|---|
| 6,229,538 B1* | 5/2001 | McIntyre | G06F 11/324 709/220 |
| 7,545,741 B1* | 6/2009 | Manickavasagam | H04L 12/66 370/230 |
| 2003/0074596 A1* | 4/2003 | Mashayekhi | G06F 11/1666 714/4.1 |
| 2007/0025253 A1* | 2/2007 | Enstone | H04L 47/10 370/235 |
| 2007/0168563 A1* | 7/2007 | Jha | H04L 47/125 709/250 |
| 2007/0248102 A1* | 10/2007 | Wang et al. | 370/395.42 |
| 2008/0062976 A1* | 3/2008 | Mittapalli et al. | 370/389 |
| 2008/0101230 A1* | 5/2008 | Liu | H04L 12/12 370/235 |

(Continued)

Primary Examiner — Dustin Nguyen
Assistant Examiner — Hao Nguyen
(74) Attorney, Agent, or Firm — Haynes and Boone, LLP

(57) ABSTRACT

A network connection teaming system includes a processing system coupled to a memory system in an IHS chassis. The memory system is operable to receive instruction that, when executed by the processing system, cause the processing system to provide an operating system (OS). At least one network interface controller (NIC) including a plurality of network connections is located in the IHS chassis and coupled to the processing system. The NIC(s) are not directly visible to an OS provided by the processing system. A NIC teaming controller is coupled between the processing system and the NIC(s). The NIC teaming controller includes a plurality of hardware connections that are configurable to team the plurality of network connections included on the NIC(s) to provide at least one teamed network connection. An OS provided by the processing system is presented the at least one teamed network connection by the NIC teaming controller.

17 Claims, 18 Drawing Sheets

(56) References Cited

U.S. PATENT DOCUMENTS

2010/0077409 A1* 3/2010 Hernandez ............ G06F 13/102
                                                         719/326

* cited by examiner

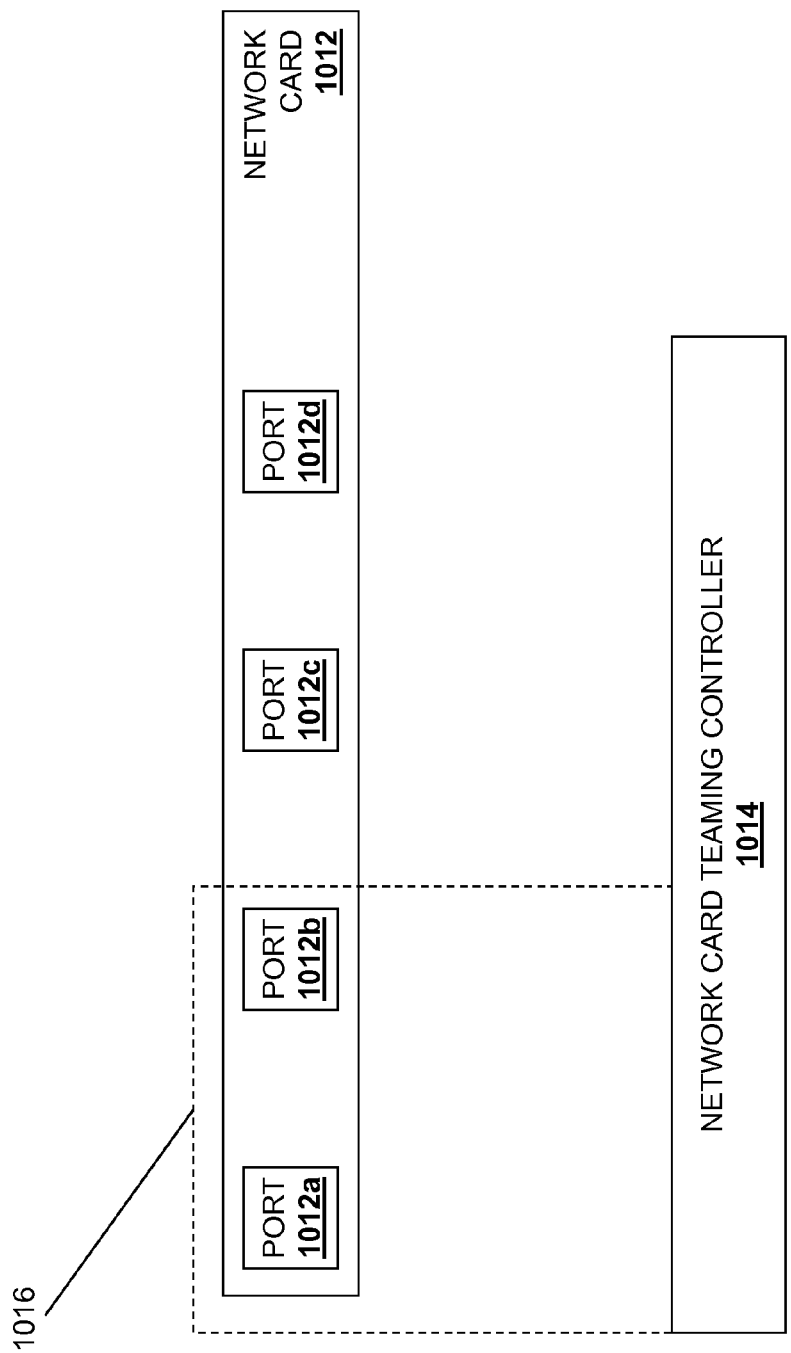

NETWORK INTERFACE CONNECTION TEAMING SYSTEM

BACKGROUND

The present disclosure relates generally to information handling systems, and more particularly to the teaming of one or more network connections in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may include one or more network connections that may be teamed or aggregated to increase throughput beyond what a single network connection can sustain, and to provide redundancy in case one of the network connections fails. For example, server IHSs may include a plurality of network interface controllers or network interface cards (NICs), each having a plurality of connections or ports. Conventionally, an operating system deployed on the server IHS may use software to team or aggregate the NICs such that the plurality of NICs are viewed as a single NIC with a number of ports equal to the sum of the ports on all of the NICs. Such software teaming of NICs by the operating system raises a number of issues. For example, teaming of NICs may be performed to provide redundancy for network failures, but in the event of an operating system failure there is a high possibility that such redundancy may not be provided.

Accordingly, it would be desirable to provide an improved network interface connection teaming system.

SUMMARY

According to one embodiment, a network connection teaming system includes an operating system (OS) provisioning system; at least one network interface controller (NIC) including a plurality of network connections; and a NIC teaming controller coupled between the OS provisioning system and the at least one NIC, wherein the NIC teaming controller includes a plurality of hardware connections that are configurable to team the plurality of network connections included on the at least one NIC to provide at least one teamed network connection, and wherein an OS provided on the OS provisioning system is presented the at least one teamed network connection by the NIC teaming controller to interact with the at least one NIC.

BRIEF DESCRIPTION OF THE DRAWINGS

FIG. 9b is a schematic view illustrating an embodiment of a pair of network cards teamed according to the card level teaming option of FIG. 9a.

FIG. 10b is a schematic view illustrating an embodiment of a network card with ports teamed according to the port level teaming option of FIG. 10a.

FIG. 11b is a schematic view illustrating an embodiment of a plurality of network cards with ports teamed according to the port level teaming option of FIG. 11a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
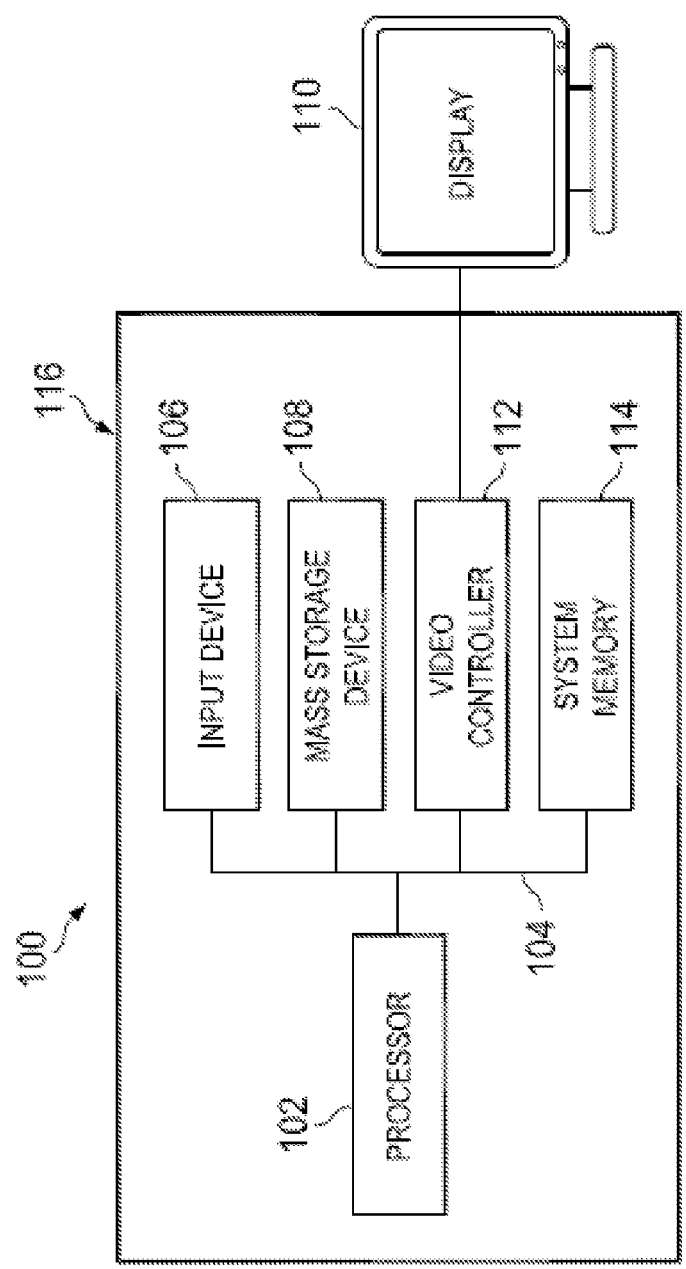
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
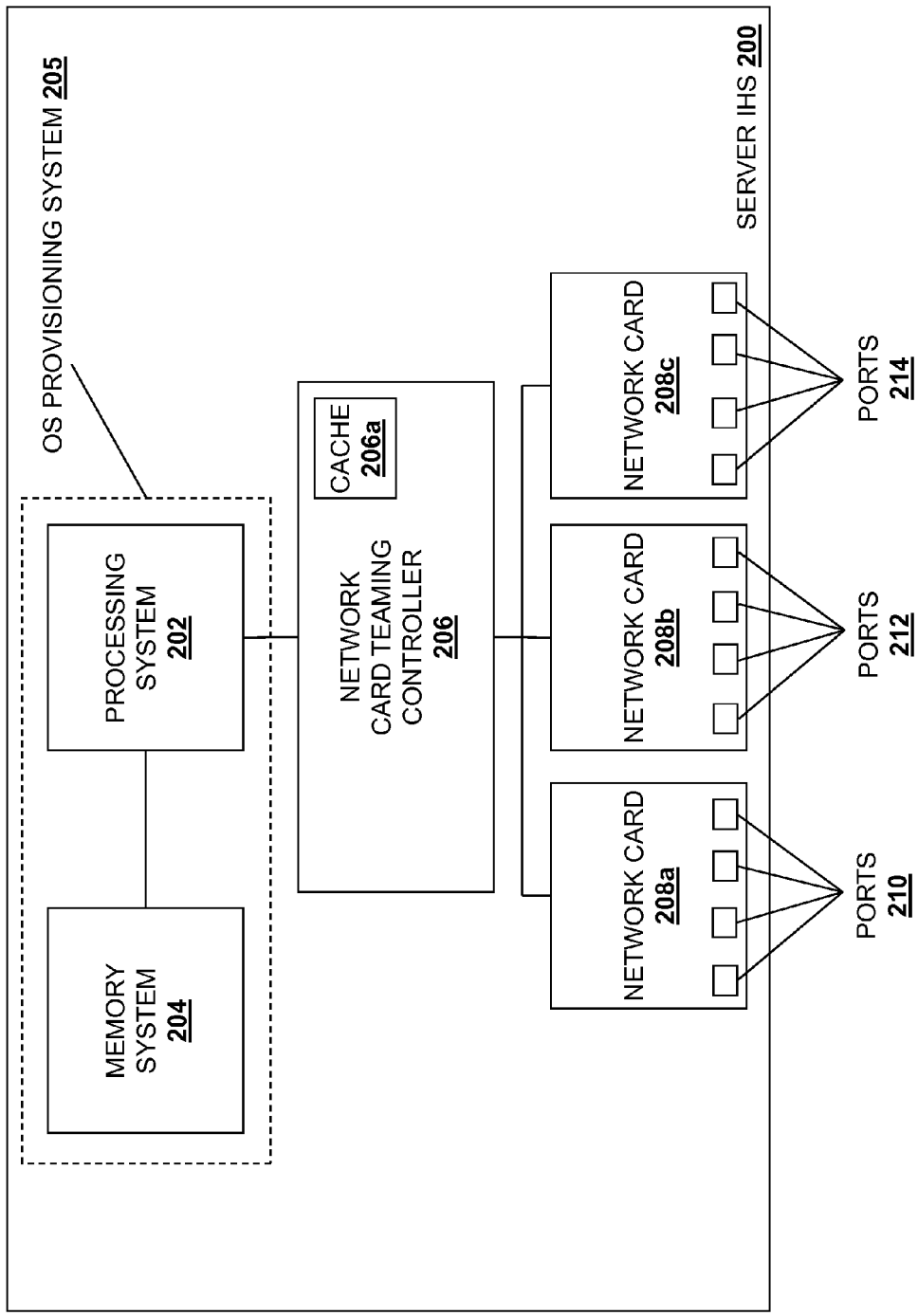
FIG. 2 is a schematic view illustrating an embodiment of a server IHS including a network connection teaming system.

Referring now to FIG. 2, an embodiment of a server IHS 200 that includes a network connection teaming system is illustrated. In an embodiment, the server IHS 200 may be the IHS 100, discussed above with reference to FIG. 1, and/or include some or all of the components of the IHS 100. While the network connection teaming system is described herein as implemented in a server IHS, one of skill in the art will recognize that the network interface connection teaming system may be provided in any of a variety of IHSs known in the art without departing from the scope of the present disclosure. The server IHS 200 includes a processing system 202 that may include one or more processors such as, for example, the processor 102 discussed above with reference to FIG. 1. A memory system 204 is coupled to the processing system 202 and may include the system memory 114 and/or storage device 108 discussed above with reference to FIG. 1, or other memory devices known in the art. In an embodiment, the combination of the processing system 202 and the memory system 204 may provide an operating system provisioning system 205 that provides an operating system on the server IHS 200. For example, the memory system 204 may include instructions that, when executed by the processing system 202, cause the processing system 202 to provide the operating system on the server IHS 200.

In the illustrated embodiment, a network card teaming controller 206 is coupled to the processing system 202 and each of a plurality of network cards 208a, 208b, and 208c. The network card 208a includes a plurality of network connections or ports 210, the network card 208b includes a plurality of network connections or ports 212, and the network card 208c includes a plurality of network connections or ports 214. As discussed below, the network cards 208a, 208b, 208c are network interface controllers (NICs) in the server IHS 200, and the network card teaming controller 206 is a controller that is operable to team network interface controllers and/or network connections on one or more network interface controllers through hardware. For example, the network card teaming controller 206 may include a circuit board with a plurality of configurable hardware connections that connect the network cards 208a, 208b, and 208c and/or their ports 210, 212, and 214 to the operating system provision system 205. In an embodiment, the configurable hardware connections on the network card teaming controller 206 include the physical connections between the network teaming controller 206 and the plurality of network cards 208a, 208b, and 208c, as well as a memory that stores the teaming configurations that are provided by a user and that determine how the network cards 208a, 208b, and/or 208c, and/or their ports, will be presented to an OS provided on the server IHS 200. However, the configurable hardware connections may include a variety of configurable hardware connection components known in the art. The network card teaming controller 206 also includes a cache 206a that may store actions performed by the network card teaming controller 106 such as, for example, any current transmission of data such that a transmission failure will allow that data to be re-transmitted (i.e., if the cache is used effectively, the last transmission of data before a failure such as a loss of power will be stored in the cache such that that data may be delivered to its destination upon correction of the failure.) While the network interface connection teaming system is illustrated and described herein as including three network cards 208a, 208b, and 208c, any number of any types of network interface controllers are envisioned as falling within the scope of the present disclosure.

Figure 3:
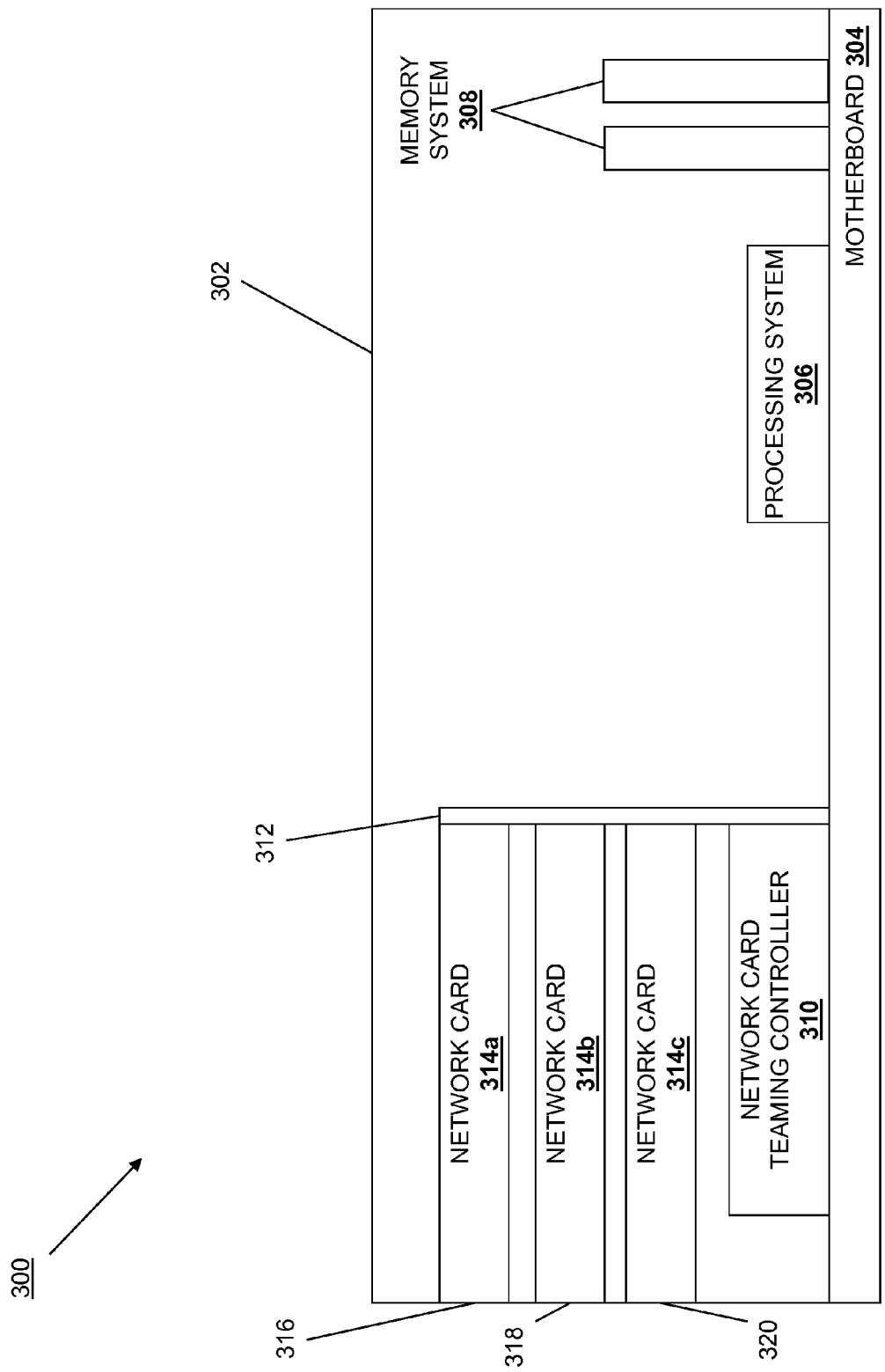
FIG. 3 is a schematic view illustrating an embodiment of an IHS including a network connection teaming system.

Referring now to FIG. 3, an embodiment of an IHS 300 that includes a network connection teaming system is illustrated. In an embodiment, the IHS 300 may be the IHS 100, discussed above with reference to FIG. 1, and/or include some or all of the components of the IHS 100. The IHS 300 includes a chassis 302 that may be, for example, a rack chassis that houses the components of the IHS 300 and that is operable to couple to an IHS rack that houses a plurality of IHSs such as, for example, server IHSs, switch IHSs, storage IHSs, and/or a variety of other rack IHSs known in the art. A motherboard 304 is housed in the chassis 302 and may include circuit boards known in the art for connecting and providing communication between components of the IHS 300. A processing system 306 and a memory system 308 are connected to the motherboard 304 using methods known in the art. A network card teaming controller 310 is directly connected to the motherboard 304 using, for example, a controller slot (not illustrated) mounted to the motherboard 304 that receives the network card teaming controller 310, and/or a variety of other direct motherboard connections known in the art. As discussed above, the network card teaming controller 306 is a controller that is operable to team network interface controllers and/or network connections on one or more network interface controllers through, for example, configurable hardware connections provided on a circuit board that may be directly connected to the motherboard 304.

A network interface controller coupling device 312 couples the network card teaming controller 310 to each of a plurality of network cards 314a, 314b, and 314c. In the illustrated embodiment, the network interface controller coupling device 312 is illustrated as a riser or other circuit board that provides connections (e.g., Peripheral Component Interconnect express (PCIe) connections) for each of the network cards 314a, 314b, and 314c, while also providing for communication between the network card teaming controller 310 and the network cards 314a, 314b, and 314c through those connections. However, the network interface controller coupling device 312 may be provided by any data connections between the network card teaming controller 310 and the network cards 314a, 314b, and 314c including, for example, high speed connections through the motherboard 304, a controller slot (not illustrated) mounted to the motherboard 304 that receives the network card teaming controller 310 along with a bus that is connected to the controller slot as well as the network cards 314a, 314b, and 314c (as well as other interfaces for receiving network cards such that any network card attached to the IHS 300 will connect to the bus and be recognizable by the network card teaming controller 310), and/or a variety of other data connections known in the art. Thus, in an embodiment, the network cards 314a, 314b, and 314c are not directly coupled to the motherboard 304, but rather are coupled to the motherboard 304 through the network card teaming controller 310, which is provided between the operating system provisioning system 205 (discussed above with reference to FIG. 2) and the network cards 314a, 314b, and 314c (or network cards 208a, 208b, and 208c with reference to FIG. 2.) However, in other embodiments, the network cards 314a, 314b, and 314c may be directly coupled to the motherboard 304 but otherwise not visible to an operating system provided by the operating system provisioning system 205. The network card 314a includes a plurality of network connections or ports 316, the network card 314b includes a plurality of network connections or ports 318, and the network card 314c includes a plurality of network connections or ports 320, each of which may be accessible from outside the chassis 302.

Figure 4:
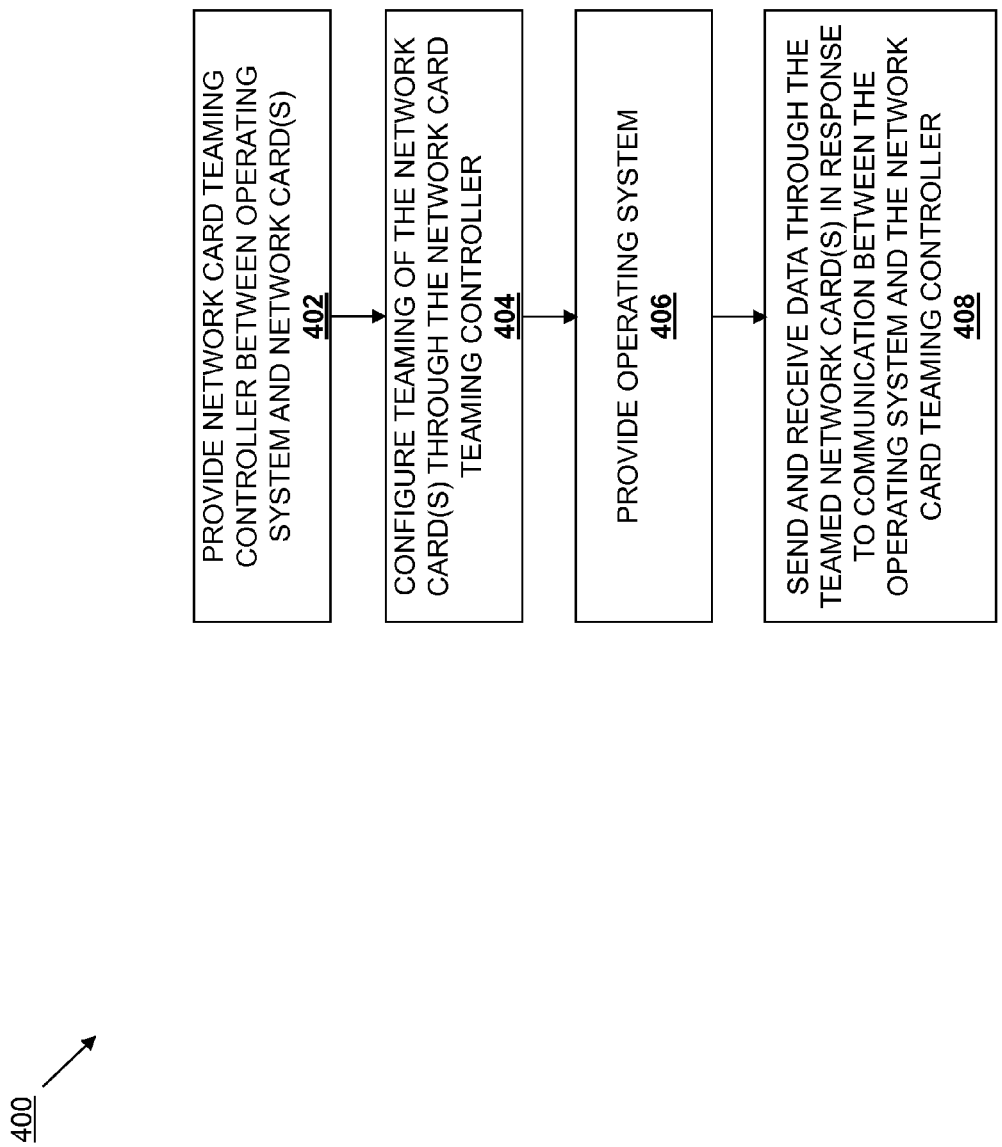
FIG. 4 is a flow chart illustrating an embodiment of a method for teaming network connections.

Referring now to FIGS. 2 and 4, a method 400 for teaming network connections is illustrated. The method 400 begins at block 402 where a network card teaming controller is provided between an operating system and one or more network cards. As discussed above, the network card teaming controller 206 may be coupled between an operating system provisioning system 205 (through a connection to the processing system 202 in the illustrated embodiment) and network cards 208a, 208b, and 208c such that an operating system provided by the operating system provisioning system 205 communicates with the network card teaming controller 206 to interact with the network cards 208a, 208b, and 208c. The provision of the network card teaming controller 206 between an operating system and the network cards 208a, 208b, and 208c may be realized in a variety of ways. For example, the network interface teaming controller 206 may be directly connected to first circuit board that is also directly connected to the processing system 202 that provides the operating system, while also being connected to a second circuit board that connects each of the network cards 208a, 208b, and 208c to the network card teaming controller 206.

In another example, each of the network card teaming controller 206 and the network cards 208a, 208b, and 208c may be directly connected to a circuit board that is directly connected to the processing system 202 that provides the operating system, and drivers for communication between the operating system and the network card teaming controller 206 are provided in the memory system 204 while drivers for communication between the operating system and the network cards 208a, 208b, and 208c are not be provided in the memory system 204. In such an example, the operating system will not be able to communicate directly with the network cards 208a, 208b, and 208c (due to a lack of a driver to do so), but will be able to communicate with the network card teaming controller 206 such that the operating system may interact with the network cards 208a, 208b, and 208c indirectly (e.g., through the driver-enabled communication with the network card teaming controller 206.) Thus, in an embodiment of the network connection teaming system of the present disclosure, the network cards 208s, 208b, and 208b may be separated from the operating system in a variety of manners such that the network cards 208a, 208b, and 208c are not directly visible to an operating system provided by the operating system provisioning system 205, resulting in interactions between the operating system and the network cards 208a, 208b, and 208c being facilitated by the network card teaming controller 206, as discussed in further detail below.

Referring now to FIGS. 4, 5, 6, 7, 8, 9, 10, 11a, 11b, 12a, and 12b, the method 400 then proceeds to block 404 where teaming of the network card(s) is configured through the network card teaming controller. As discussed in further details below, the hardware connections on the network card teaming controller 206 may be configured to team two or more of the network cards 208a, 208b, and/or 208c, and/or two or more ports 210, 212, and/or 214 on at least one of the network cards 208a, 208b, and 208c. As discussed below, configuring the teaming of the network card(s) in hardware provides several benefits over operating system software enabled methods including, for example, relieving the operating system of the need for teaming software and preventing operating system issues from affecting network communications. In some embodiments, all of the ports on the network card(s) that are teamed will be active. For example, in order to perform network interface teaming, all of the ports that will be configured may be connected to different switches, routers, or other network devices, such that when teaming is performed, traffic may be sent with any of those ports rather than a single port.

Figure 5:
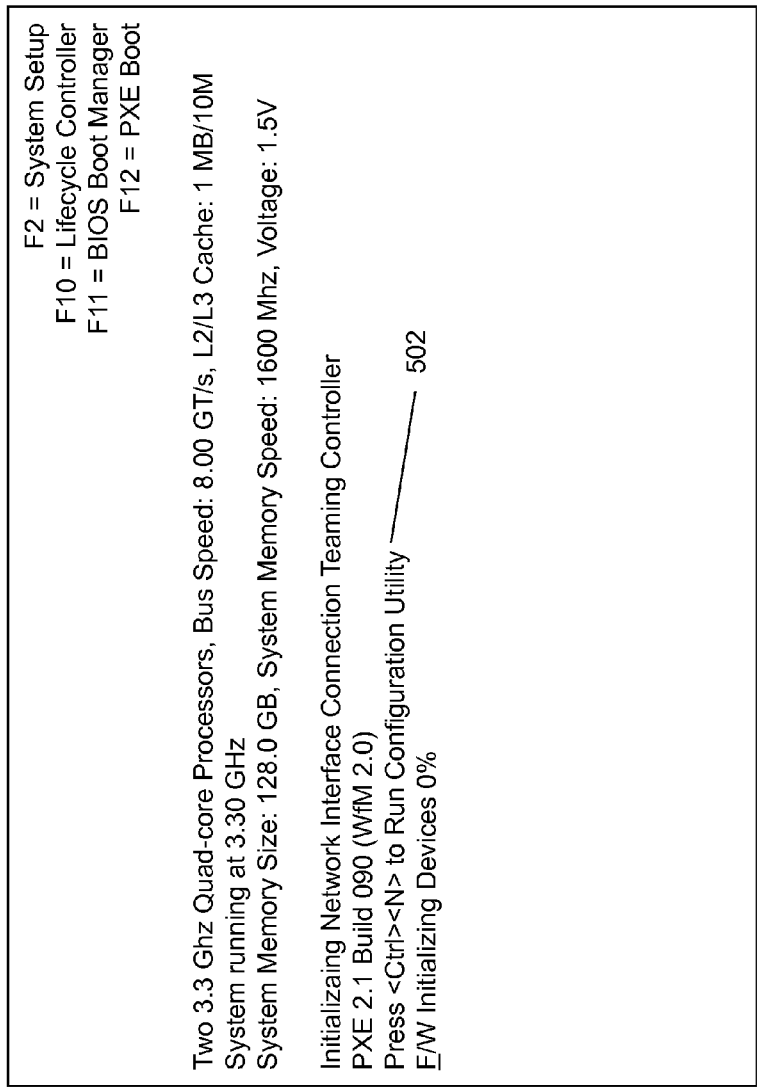
FIG. 5 is a screen shot illustrating an embodiment of a start-up screen.

Referring now to FIG. 5, an embodiment of a start-up screen 500 is illustrated. In an embodiment, the screens illustrated in FIGS. 5, 6, 7, 8, 9, 10, 11a, 11b, 12a, and 12b may be provided on the IHS that includes the network connection teaming system (e.g., the server IHS 200 or the IHS 300), or on an IHS connected to the IHS that includes the network connection teaming system (e.g., a management IHS coupled to that IHS directly or through a network.) For example, the user may interact with the IHS using an input device (e.g., the input device 106) to provide instructions to a processing system and that processing system may operate to display the screens below while also sending commands to the network card teaming controller to configure the hardware connections as discussed below. The start-up screen 500 may be provided upon initialization, reset, or other start-up action of the IHS that includes the network connection teaming system, upon a management command provided to the IHS that includes the network connection teaming system, and/or in response to a variety of other IHS configuration scenarios known in the art. The start-up screen 500 includes a teaming configuration command 502 that is displayed to the user (e.g., "Press <Ctrl><N> to Run Configuration Utility") and that provide the user instructions on how to access the teaming configuration screens discussed below. While the teaming configuration command 502 of the illustrated embodiment includes a keyboard combination (e.g., the simultaneous pressing of the Ctrl key and the n key) that must be provided while the start-up screen 500 is displayed, one of skill in the art will recognize that a variety of different teaming configuration commands to access the teaming configuration screens discussed below will fall within the scope of the present disclosure.

Figure 6:
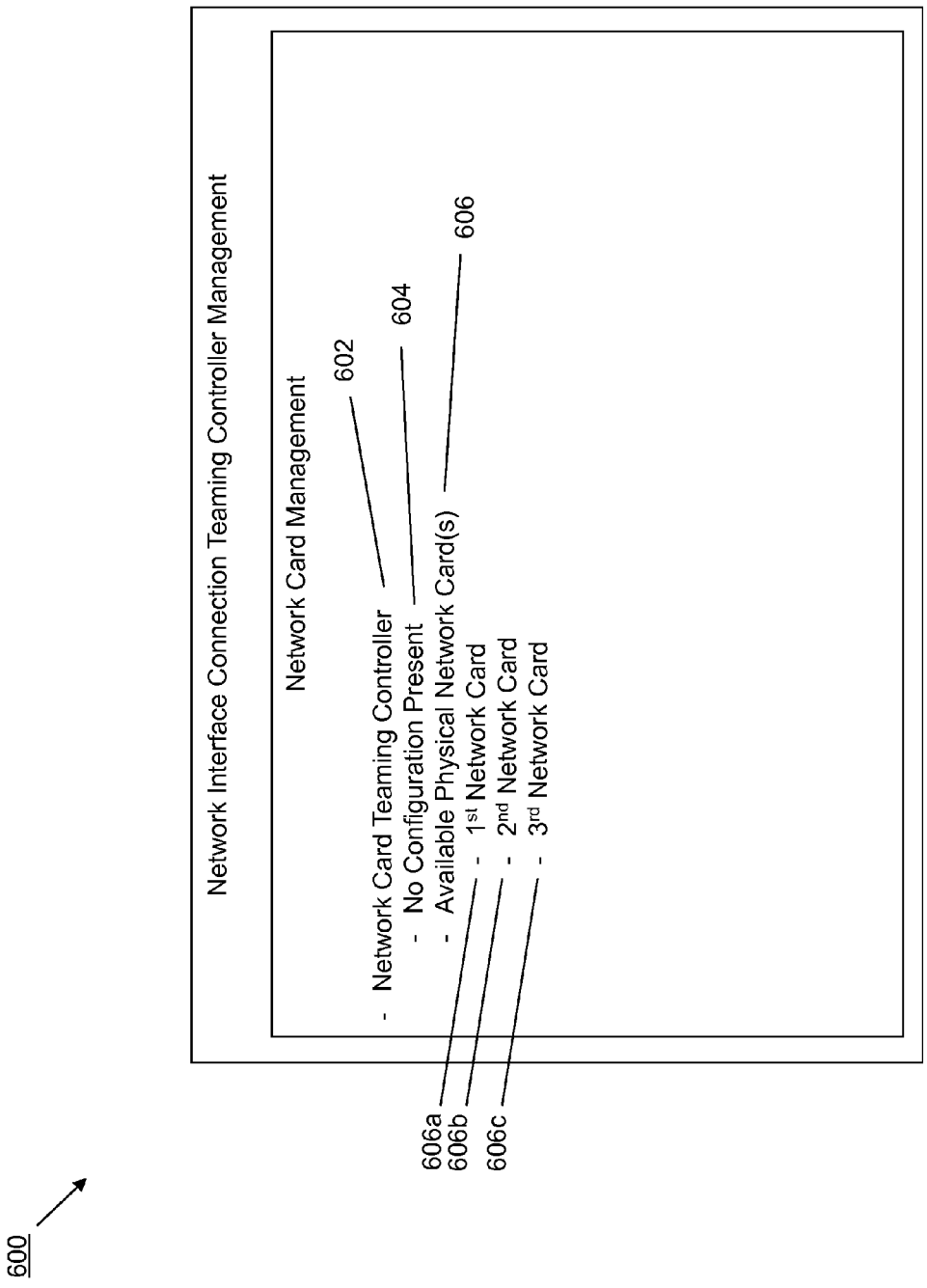
FIG. 6 is a screen shot illustrating an embodiment of a network card management screen prior to the provision of a teaming configuration.

Referring now to FIG. 6, an embodiment of a network card management screen 600 is illustrated. In an embodiment, the network card management screen 600 may be provided in response to a user providing the keyboard combination included in the teaming configuration command 502 while the start-up screen 500 is displayed. The network card management screen 600 includes a network card teaming controller section 602 that includes a current teaming configuration(s) section 604 and an available physical network card(s) section 606. In the embodiment illustrated in FIG. 6, the current teaming configuration(s) section 604 displays the text "No Configuration Present" because no teaming configuration has been provided yet, and the available physical network card(s) section 606 includes first network card 606a, second network card 606b, and third network card 606c, which may correspond to respective network cards 208a, 208b, and 208c discussed above with reference to FIG. 2.

Figure 7:
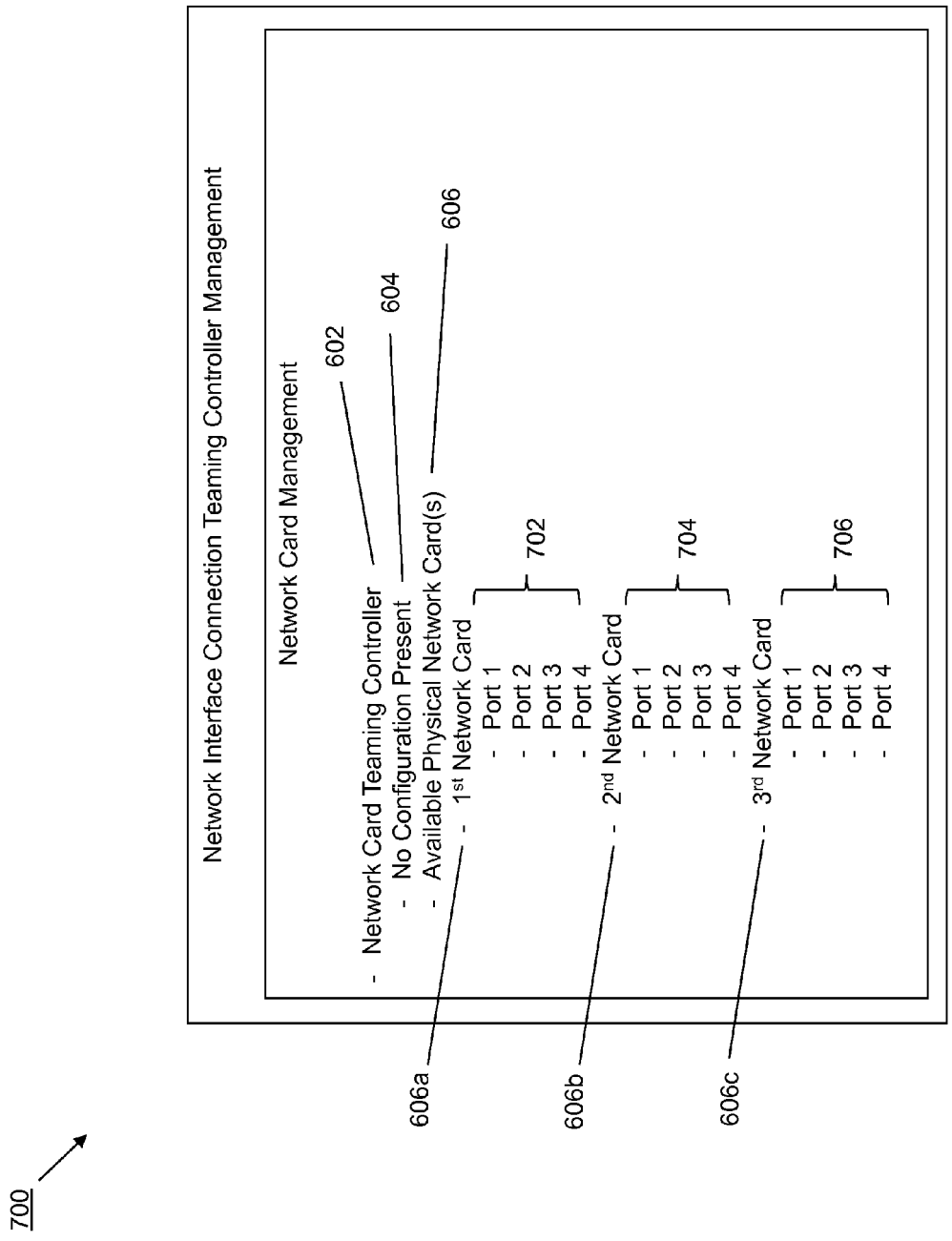
FIG. 7 is a screen shot illustrating an embodiment of a network card management screen displaying a plurality of network connections on a plurality of network interface controllers.

Referring now to FIG. 7, an embodiment of a network card management screen 700 is illustrated. In an embodiment, the network card management screen 700 may be provided in response to a user selecting each of the first network card 606a, second network card 606b, and third network card 606c in the available physical network card(s) section 606 on the network card management screen 600. As can be seen in the illustrated embodiment, selection of first network card 606a, second network card 606b, and third network card 606c expands the first network card 606a to provide a plurality of network connections or ports 702 on the first network card 606a, expands the second network card 606b to provide a plurality of network connections or ports 704 on the second network card 606b, and expands the third network card 606c to provide a plurality of network connections or ports 706 on the third network card 606c.

Figure 8:
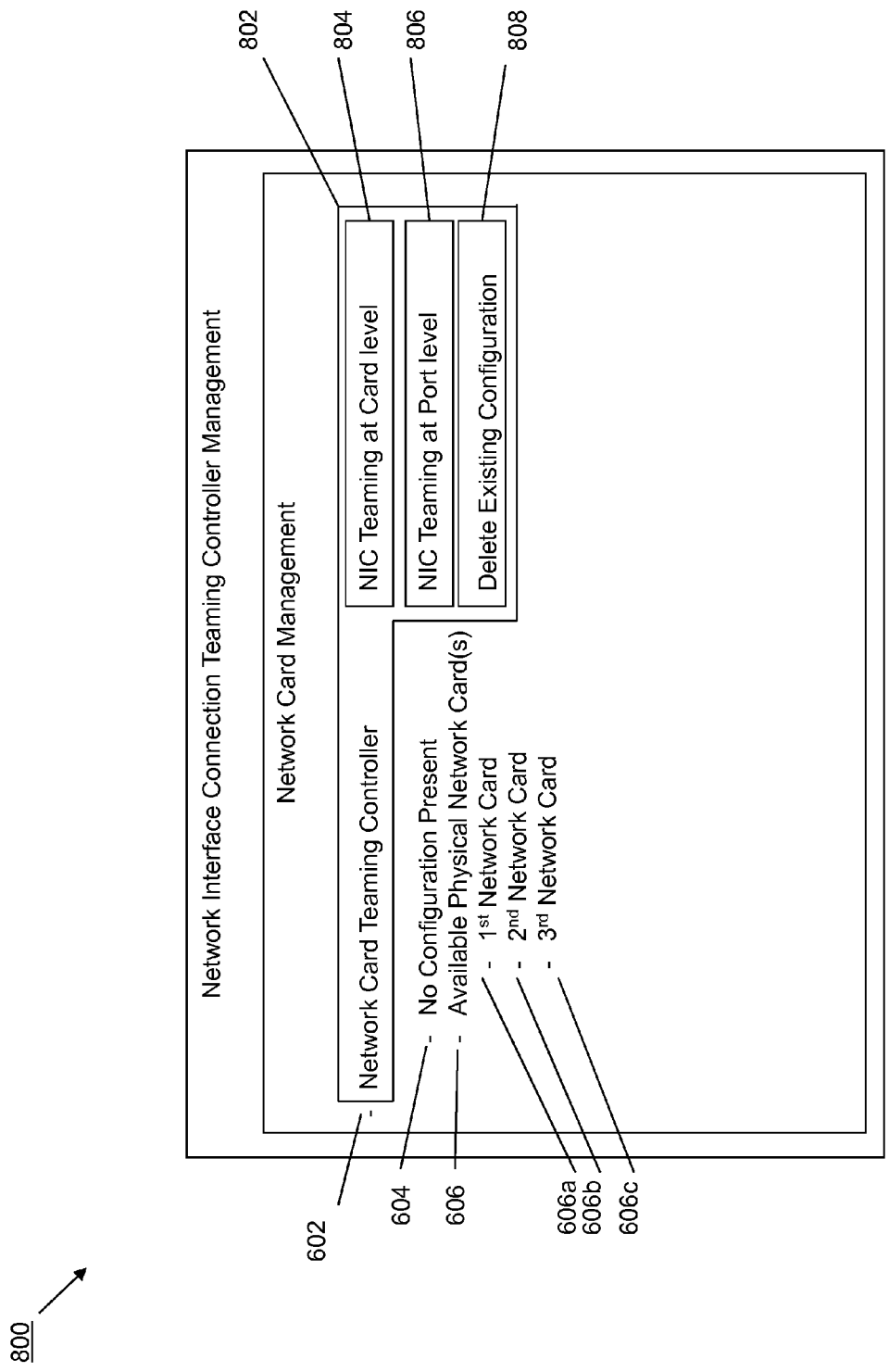
FIG. 8 is a screen shot illustrating an embodiment of a network card management screen displaying a teaming configuration selection window.

Referring now to FIG. 8, an embodiment of a network card management screen 800 is illustrated. In an embodiment, the network card management screen 800 may be provided in response to a user selecting the network card teaming controller section 602 on the network card management screen 600. In response to selecting the network card teaming controller section 602, a teaming selection window 802 is provided. The teaming selection window 802 includes a plurality of teaming options, which in the illustrated embodiment include a card level teaming option 804, a port level teaming option 806, and a configuration deleting option 808. As discussed in further detail below, the card level teaming option 804 allows a user to configure the hardware connections on the network card teaming controller 206 to team a plurality of the network cards 208a, 208b, and 208c, the port level teaming option 806 allows a user to configure the hardware connections on the network card teaming controller 206 to team network connections or ports 210, 212, and/or 214 on one or more of the network cards 208a, 208b, and 208c, and the configuration deleting option 808 allows a user to delete an existing configuration (e.g., as detailed in the current teaming configuration(s) section 604.)

Figure 9A:
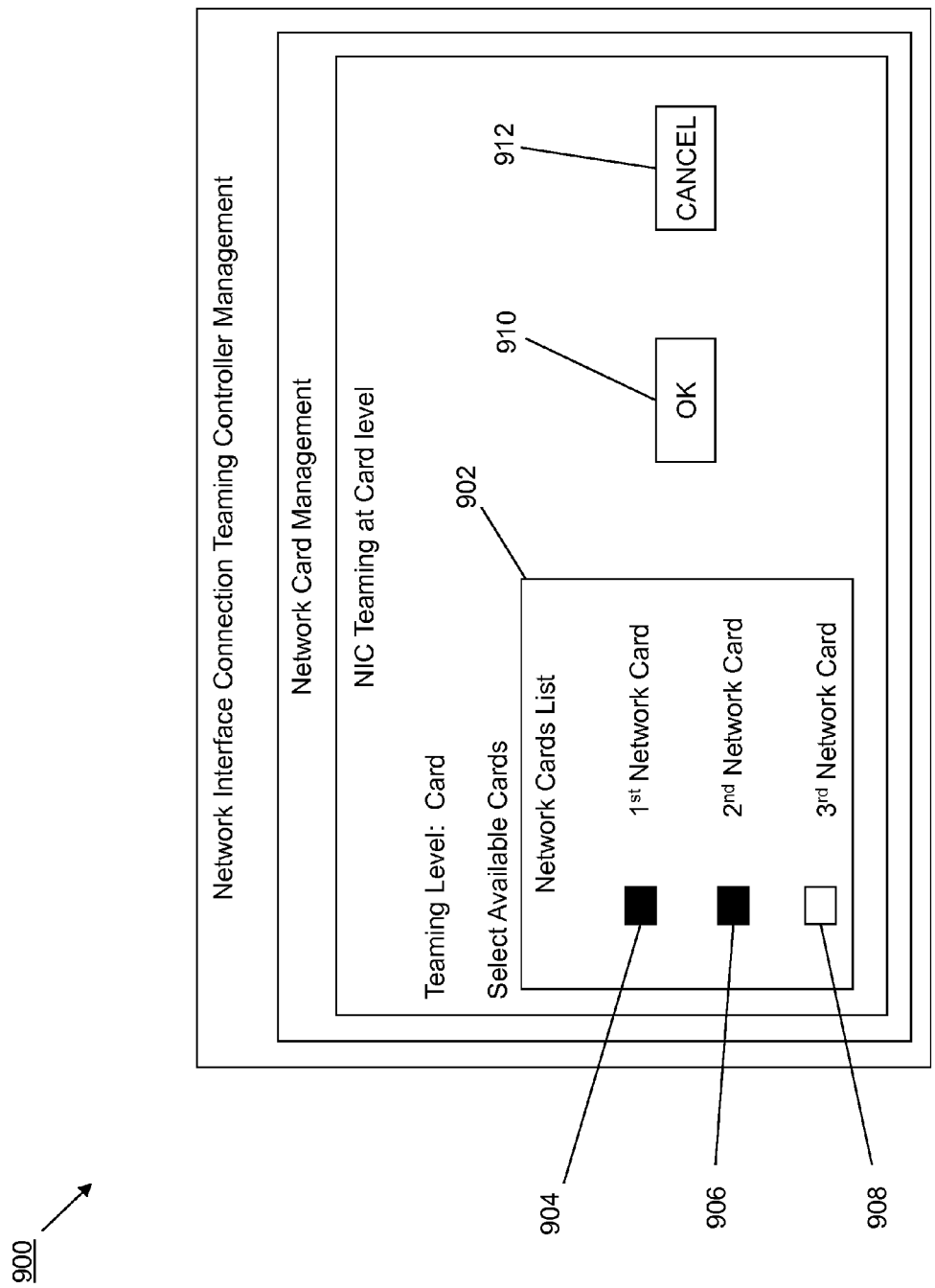
FIG. 9a is a screen shot illustrating an embodiment of a network card management screen displaying a card level teaming option.

Referring now to FIG. 9a, an embodiment of a network card management screen 900 is illustrated. In an embodiment, the network card management screen 900 may be provided in response to a user selecting the card level teaming option 804 on the network card management screen 800. The network card management screen 900 includes a card level teaming window 902 that allows the user to select network cards for teaming through the configuration of the hardware connections on the network card teaming controller 206. For example, in the illustrated embodiment, the card level teaming window 902 includes a first network card selector 904 that may allow the user to select the network card 208a for teaming, a second network card selector 906 that may allow the user to select the network card 208b for teaming, and third network card selector 908 that may allow the user to select the network card 208c for teaming. An OK button 910 allows the user to save the card level teaming selections made in the card level teaming window 902, while a CANCEL button 912 allows the user to cancel the card level teaming selection made in the card level teaming window 902. In the embodiment illustrated in FIG. 9a, the user has selected the first network card selector 904 and the second network card selector 906 to team the network cards 208a and 208b by configuring the hardware connections on the network card teaming controller 206.

Figure 9B:
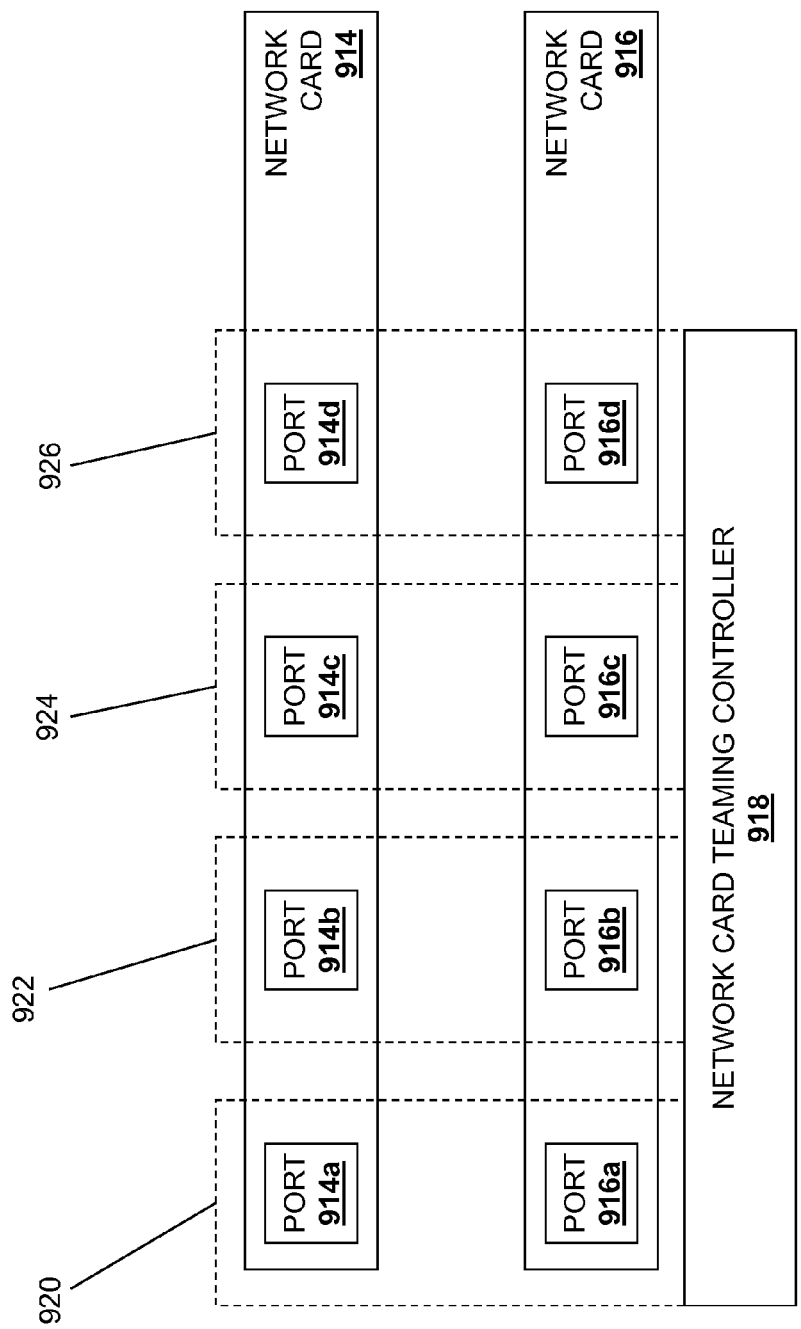

Referring now to FIG. 9b, an embodiment of a pair of network cards 914 and 916, which may be the network cards 208a and 208b of FIG. 2, are illustrated teamed according to the selections made using the network card management screen 900. In an embodiment, in response to selecting the first network card selector 904 and the second network card selector 906 in the card level teaming window 902 on the network card management screen 900 (as illustrated), the hardware connections on a network card teaming controller 918, which may be the network card teaming controller 206 of FIG. 2, are configured to team the network cards 914 and 916 such that they are presented to the operating system as a single network card. For example, the network card 914 in the illustrated embodiment includes four network connections or ports 914a, 914b, 914c, and 914d, and the network card 916 in the illustrated embodiment includes four network connections or ports 916a, 916b, 916c, and 916d. In response to the teaming selections made by the user on the network card management screen 900, the hardware connections on the network card teaming controller 918 may be configured to team the network cards 914 such that they are presented to the operating system as a single network card with four ports 920, 922, 924, and 926: a first port 920 combining port 914a and port 916a, a second port 922 combining port 914b and port 916b, a third port 924 combining port 914c and port 916c, and a fourth port 926 combining port 914d and port 916d. One of skill in the art will recognize that the teaming configuration illustrated in FIG. 9b provides card level redundancy. However, the teaming of any plurality of network cards may differ from the illustrated embodiment, and teaming configurations may include teaming any port or ports on a first card and any ports on a second card or cards. Thus, in different embodiments, a user or administrator may select any combination of ports regardless of where those ports are located.

Figure 9C:
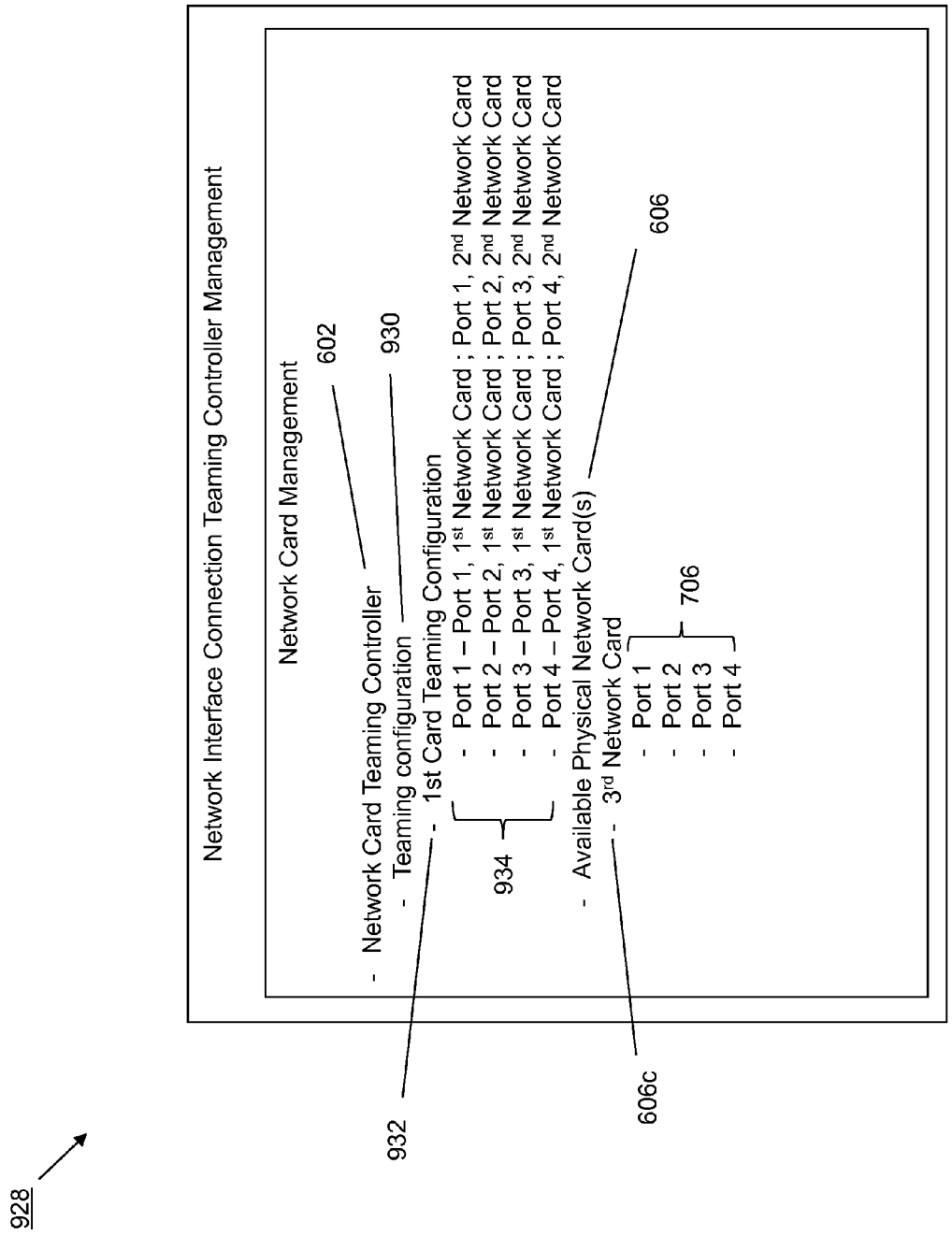
FIG. 9c is a screen shot illustrating an embodiment of a network card management screen displaying a card level teaming configuration.

Referring now to FIG. 9c, an embodiment of a network card management screen 928 is illustrated. In an embodiment, the network card management screen 928 may be provided in response to a user providing the selections discussed above using the network card management screen 900. The network card management screen 928 includes the network card teaming controller section 602 and the available physical network card(s) section 606 having the third network card 606c discussed above with reference to FIG. 6, as well as the plurality of network connections or ports 706 for the third network card 606c discussed above with reference to FIG. 7. However, the current teaming configuration(s) section 604 of FIG. 6 has been replaced with a current teaming configuration(s) section 930 that details the teaming configuration provided by the user selections discussed above using the network card management screen 900. The current teaming configuration(s) section 930 includes a $1^{st}$ card teaming configuration 932 including a plurality of teamed ports 934. For example, the 1$^{st}$ card teaming configuration 932 indicates that a plurality of network cards (e.g., network cards 914 and 916) are teamed and will be presented to the operating system as a single network card, while the teamed ports 934 indicate that teamed port 1 on the teamed network card includes port 1 on a 1$^{st}$ network card (e.g., port 914$a$ on network card 914) and port 1 on a 2$^{nd}$ network card (e.g., port 916$a$ on network card 916), teamed port 2 on the teamed network card includes port 2 on a 1$^{st}$ network card (e.g., port 914$b$ on network card 914) and port 2 on a 2$^{nd}$ network card (e.g., port 916$b$ on network card 916), teamed port 3 on the teamed network card includes port 3 on a 1$^{st}$ network card (e.g., port 914$c$ on network card 914) and port 3 on a 2$^{nd}$ network card (e.g., port 916$c$ on network card 916), and teamed port 4 on the teamed network card includes port 4 on a 1$^{st}$ network card (e.g., port 914$d$ on network card 914) and port 4 on a 2$^{nd}$ network card (e.g., port 916$d$ on network card 916).

Figure 10A:
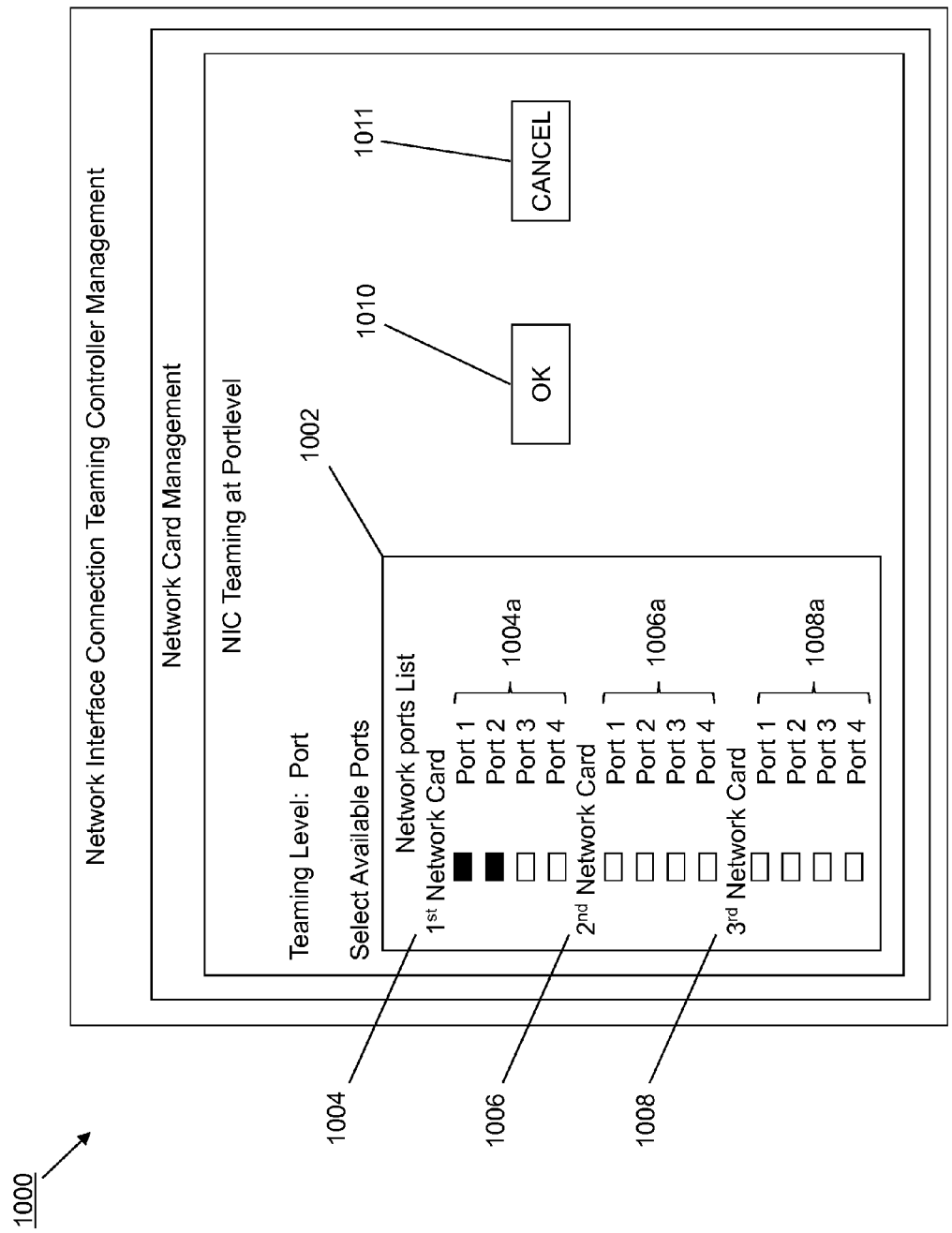
FIG. 10a is a screen shot illustrating an embodiment of a network card management screen displaying a port level teaming option.
Figure 10C:
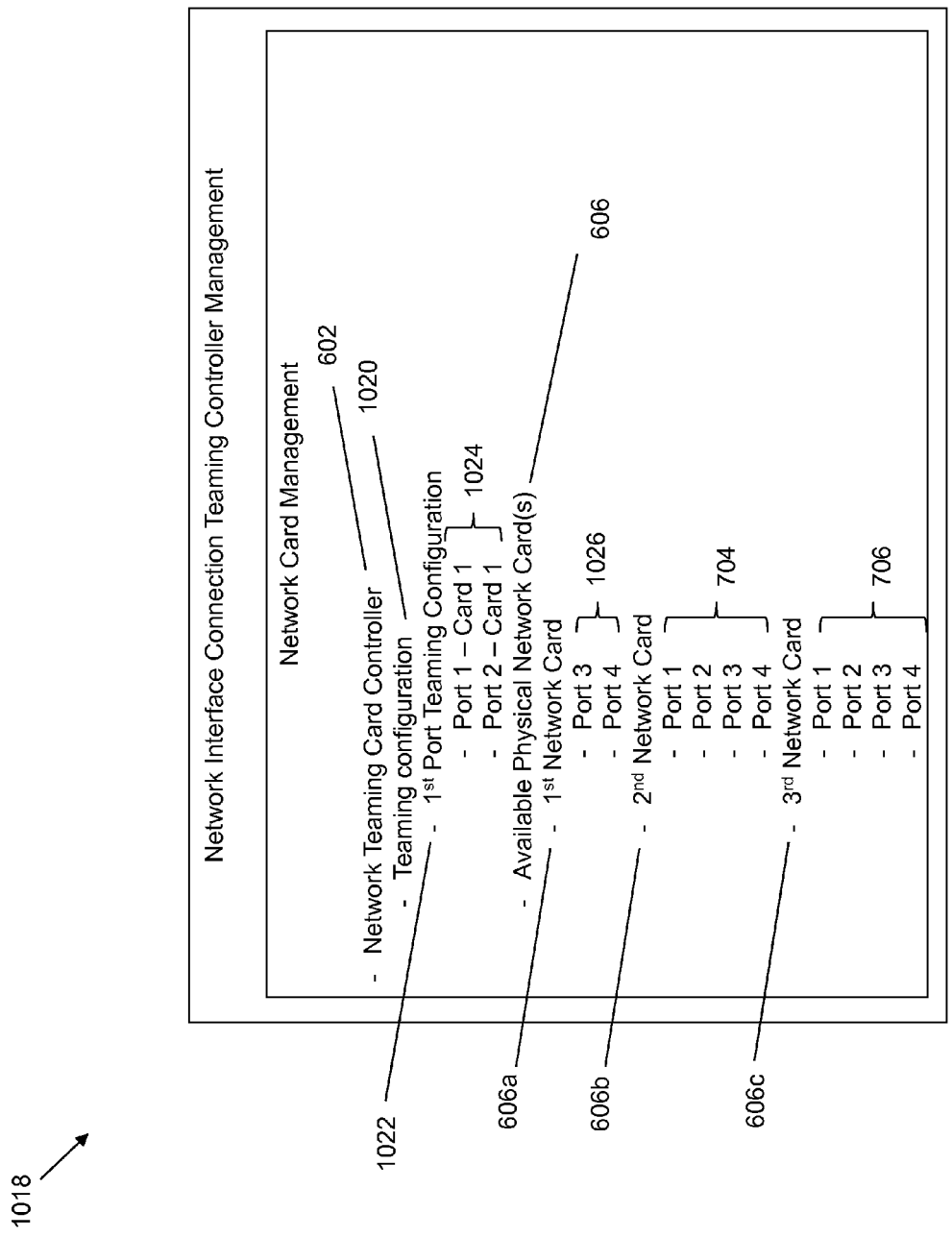
FIG. 10c is a screen shot illustrating an embodiment of a network card management screen displaying a port level teaming configuration.

Referring now to FIG. 10$a$, an embodiment of a network card management screen 1000 is illustrated. In an embodiment, the network card management screen 1000 may be provided in response to a user selecting the port level teaming option 806 on the network card management screen 800. The network card management screen 1000 includes a port level teaming window 1002 that allows the user to select network connections or ports on network cards for teaming through the configuration of the hardware connections on the network card teaming controller 206. For example, in the illustrated embodiment, the port level teaming window 1002 includes a first network card section 1004 with a plurality of network connection/port selectors 1004$a$ that may allow the user to select ports 210 the network card 208$a$ for teaming, a second network card section 1006 with a plurality of network connection/port selectors 1006$a$ that may allow the user to select ports 212 on the network card 208$b$ for teaming, and third network card section 1008 with a plurality of network connection/port selectors 1008$a$ that may allow the user to select ports 214 on the network card 208$c$ for teaming. An OK button 1010 allows the user to save the port level teaming selections made in the card level teaming window 1002, while a CANCEL button 1011 allows the user to cancel the card level teaming selections made in the card level teaming window 1002. In the embodiment illustrated in FIG. 10$a$, the user has used the plurality of network connection/port selectors 1004$a$ to select a first port and a second port in the first network card section 1004 to team a plurality of ports 210 on the network card 208$a$ by configuring the hardware connections on the network card teaming controller 206.

Referring now to FIG. 10$b$, an embodiment of a network card 1012, which may be the network card 208$a$ of FIG. 2, is illustrated teamed according to the selections made using the network card management screen 1000. In an embodiment, in response to using the plurality of network connection/port selectors 1004$a$ to select a first port and a second port in the first network card section 1004 on the network card management screen 1000 (as illustrated), the hardware connections on a network card teaming controller 1014, which may be the network card teaming controller 206 of FIG. 2, are configured to team ports on the network card 1012 such that they are presented to the operating system as a single port. For example, the network card 1012 in the illustrated embodiment includes four network connections or ports 1012$a$, 1012$b$, 1012$c$, and 1012$d$. In response to the teaming selections made by the user on the network card management screen 1000, the hardware connections on the network card teaming controller 1014 may be configured to team the ports 1012$a$ and 1012$b$ on the network card 1012 such that they are presented to the operating system as a single port 1016. However, the teaming of any plurality of ports on network cards may differ from the illustrated embodiment, and teaming configurations may include, for example, teaming port 1012$a$ and 1012$c$, 1012$b$ and 1012$d$, 1012$a$ and 1012$d$, and/or any other combination of ports on a network card or cards.

Referring now to FIG. 10$c$, an embodiment of a network card management screen 1018 is illustrated. In an embodiment, the network card management screen 1018 may be provided in response to a user providing the selections discussed above using the network card management screen 1000. The network card management screen 1018 includes the network card teaming controller section 602 and the available physical network card(s) section 606 having the first network card 606$a$, the second network card 606$b$, and the third network card 606$c$ discussed above with reference to FIG. 6, as well as the plurality of network connections or ports 704 for the second network card 606$b$ and the plurality of network connections or ports 706 for the third network card 606$c$ discussed above with reference to FIG. 7. However, the current teaming configuration(s) section 604 of FIG. 6 has been replaced with a current teaming configuration(s) section 1020 that details the teaming configuration provided by the user selections discussed above using the network card management screen 1000. The current teaming configuration(s) section 1020 includes a 1$^{st}$ port teaming configuration 1022 including a plurality of teamed ports 1024. For example, the 1$^{st}$ port teaming configuration 1022 indicates that a plurality of ports on one or more network cards (e.g., network card 1012) have been teamed, while the teamed ports 1024 indicates that teamed port includes port 1 on a 1$^{st}$ network card (e.g., port 1012$a$ on network card 1012) and port 2 on the 1$^{st}$ network card (e.g., port 1012$b$ on network card 1012). As can be seen, the teaming in the illustrated embodiment has resulted in the replacement of the plurality of network connections or ports 702, illustrated in FIG. 7, for the first network card 606$a$ in the available physical network card(s) section 606 with a plurality of network connections or ports 1026 that indicate that ports 1 and 2 on the first network card 606$a$ are no longer available.

Figure 11A:
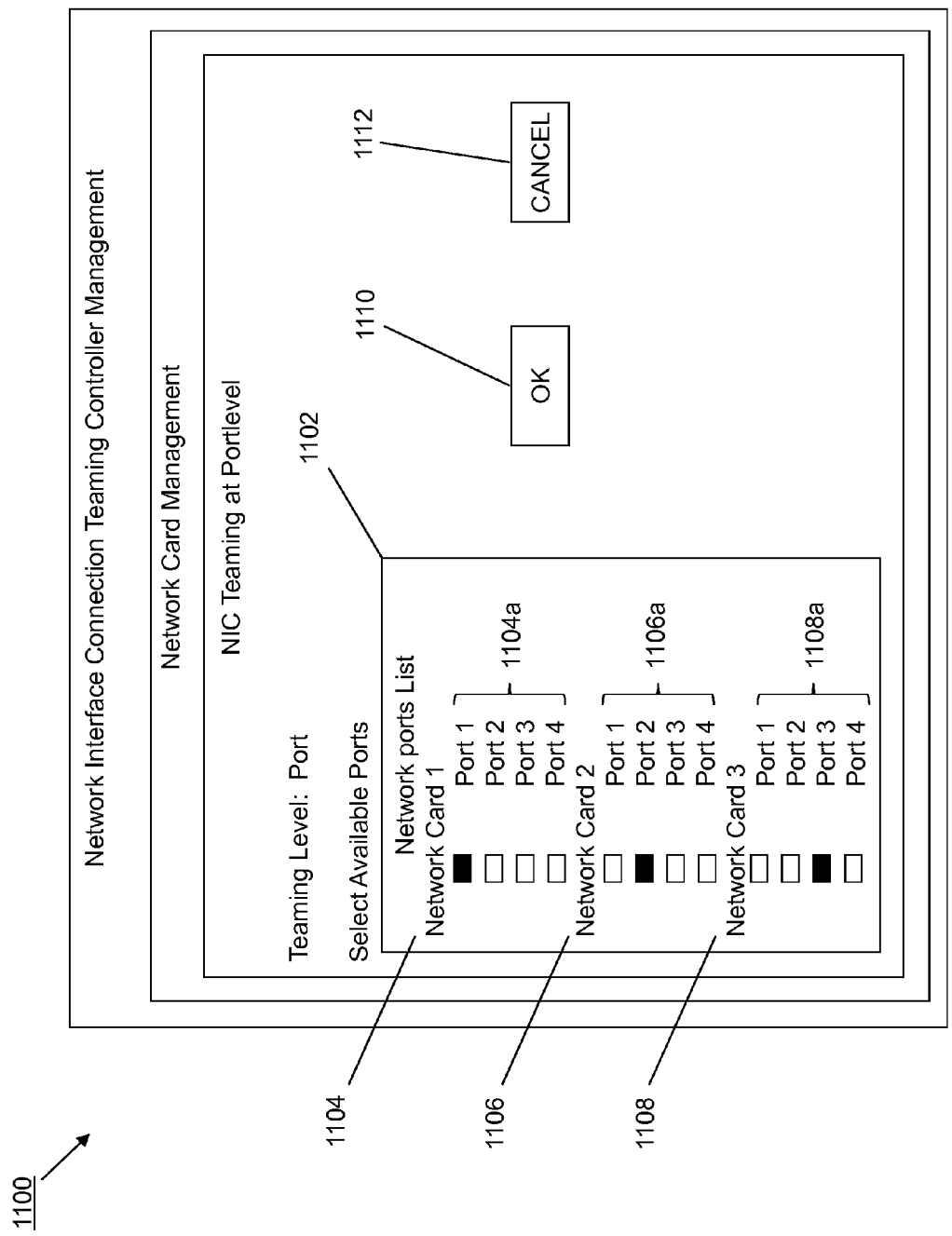
FIG. 11a is a screen shot illustrating an embodiment of a network card management screen displaying the port level teaming option.

Referring now to FIG. 11$a$, an embodiment of a network card management screen 1100 is illustrated. In an embodiment, the network card management screen 1100 may be provided in response to a user selecting the port level teaming option 806 on the network card management screen 800. The network card management screen 1100 includes a port level teaming window 1102 that allows the user to select network connections or ports on network cards for teaming through the configuration of the hardware connections on the network card teaming controller 206. For example, in the illustrated embodiment, the port level teaming window 1102 includes a first network card section 1104 with a plurality of network connection/port selectors 1104$a$ that may allow the user to select ports 210 the network card 208$a$ for teaming, a second network card section 1106 with a plurality of network connection/port selectors 1106$a$ that may allow the user to select ports 212 on the network card 208$b$ for teaming, and third network card section 1108 with a plurality of network connection/port selectors 1108$a$ that may allow the user to select ports 214 on the network card 208$c$ for teaming. An OK button 1110 allows the user to save the port level teaming selections made in the card level teaming window 1102, while a CANCEL button 1112 allows the user to cancel the card level teaming selections made in the card level teaming window 1102. In the embodiment illustrated in FIG. 11a, the user has used the plurality of network connection/port selectors 1104a, 1106a, and 1108a to select a first port in the first network card section 1004, a second port in the second network card section 1106, and a third port in the third network card section 1108 to team one of each of the ports 210, 212, and 214 on the network cards 208a, 208b, and 208c by configuring the hardware connections on the network card teaming controller 206.

Figure 11B:
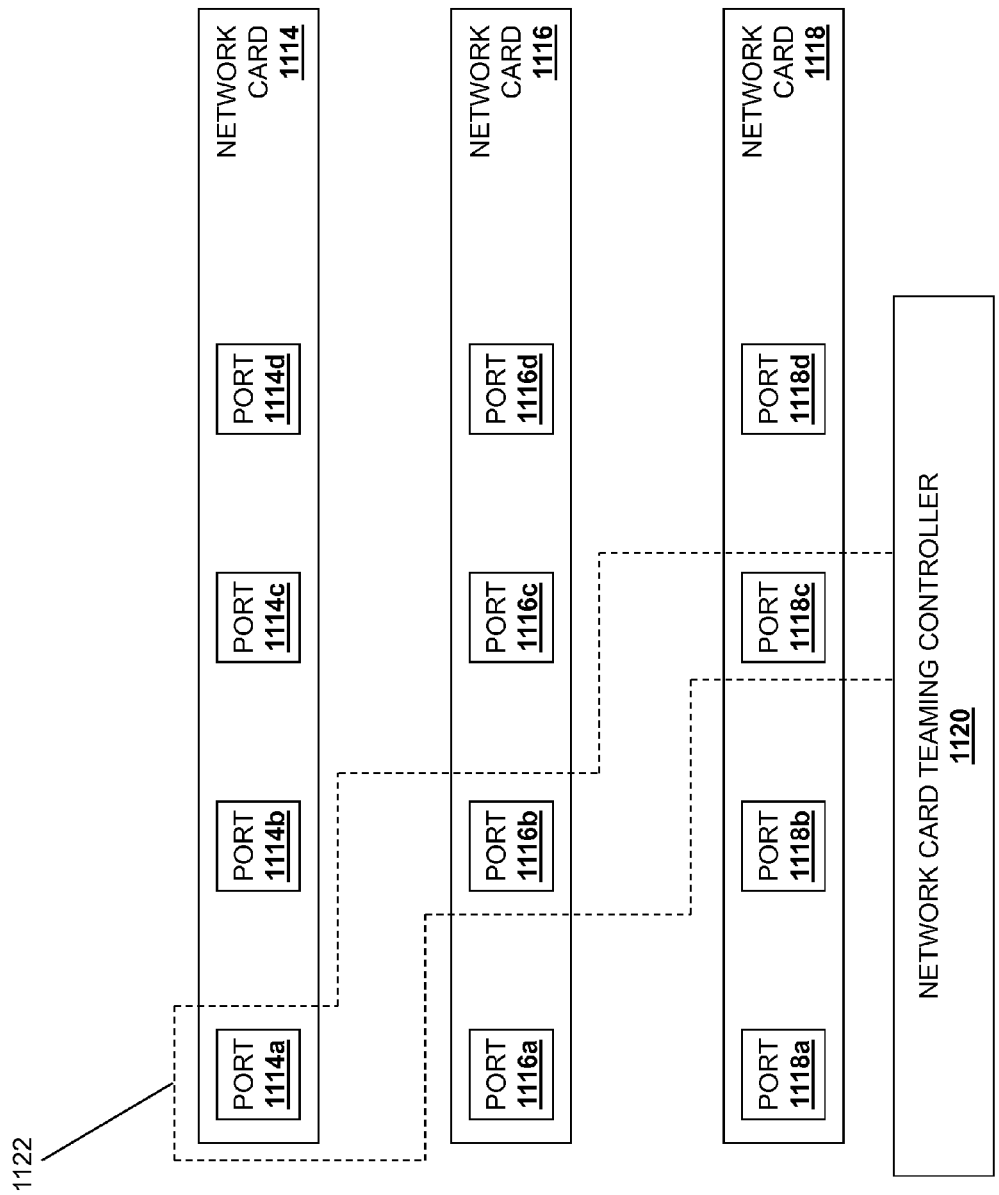

Referring now to FIG. 11b, an embodiment of a plurality of network cards 1014, 1016, and 1018, which may be the network cards 208a, 208b, and 208c of FIG. 2, are illustrated teamed according to the selections made using the network card management screen 1100. In an embodiment, in response to using the plurality of network connection/port selectors 1104a, 1106a, and 1108a to select a first port in the first network card section 1104, a second port in the second network card section 1106, and a third port in the third network card section 1108 on the network card management screen 1000 (as illustrated), the hardware connections on a network card teaming controller 1120, which may be the network card teaming controller 206 of FIG. 2, are configured to team ports on the network cards 1114, 1116, and 1118 such that they are presented to the operating system as a single port. For example, the network card 1114 in the illustrated embodiment includes four network connections or ports 1114a, 1114b, 1114c, and 1114d, the network card 1116 in the illustrated embodiment includes four network connections or ports 1116a, 1116b, 1116c, and 1116d, and the network card 1118 in the illustrated embodiment includes four network connections or ports 1118a, 1118b, 1118c, and 1118d. In response to the teaming selections made by the user on the network card management screen 1100, the hardware connections on the network card teaming controller 1120 may be configured to team the port 1114a on the network card 1114, the port 1116b on the network card 1116, and the port 1118a on the network card 1118 such that they are presented to the operating system as a single port 1122. However, the teaming of any plurality of ports on any plurality of network cards may differ from the illustrated embodiment, and teaming configurations may include teaming multiple ports in one network interface controller and single ports in all other network interface controllers. For example, ports 1114a, 1114b, 1116a, and 1118c may be teamed using the network card teaming controller 1120 to provide teaming with multiple ports on a single network card and single ports on the remaining network cards.

Figure 11C:
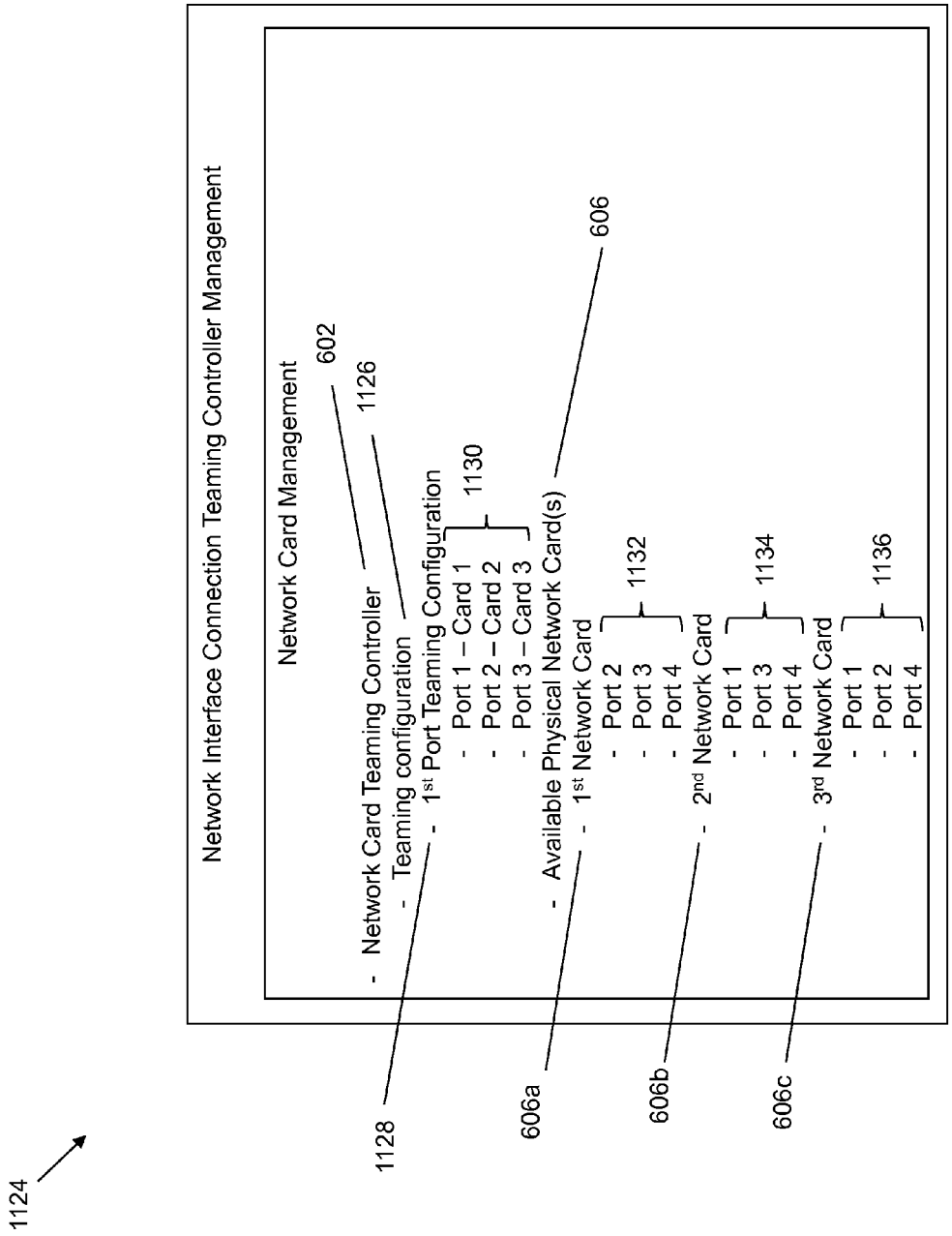
FIG. 11c is a screen shot illustrating an embodiment of a network card management screen displaying a port level teaming configuration.

Referring now to FIG. 11c, an embodiment of a network card management screen 1124 is illustrated. In an embodiment, the network card management screen 1124 may be provided in response to a user providing the selections discussed above using the network card management screen 1100. The network card management screen 1124 includes the network card teaming controller section 602 and the available physical network card(s) section 606 having the first network card 606a, the second network card 606b, and the third network card 606c discussed above with reference to FIG. 6. However, the current teaming configuration(s) section 604 of FIG. 6 has been replaced with a current teaming configuration(s) section 1126 that details the teaming configuration provided by the user selections discussed above using the network card management screen 1100. The current teaming configuration(s) section 1126 includes a $1^{st}$ port teaming configuration 1128 including a plurality of teamed ports 1130. For example, the $1^{st}$ port teaming configuration 1128 indicates that a plurality of ports on one or more network cards (e.g., the network cards 1114, 1116, and 1118) have been teamed, while the teamed ports 1130 indicates that teamed port includes port 1 on a $1^{st}$ network card (e.g., port 1114a on network card 1114), port 2 on a $2^{nd}$ network card (e.g., port 1116b on network card 1116), and port 3 on a third network card (e.g., port 1118c on network card 1118). As can be seen, the teaming in the illustrated embodiment has resulted in the replacement of the plurality of network connections or ports 702, 704, and 706, illustrated in FIG. 7, for the first network card 606a, second network card 606b, and the third network card 606c in the available physical network card(s) section 606 with a plurality of network connections or ports 1132, 1134, and 1136 that indicate that port 1 on the first network card 606a, port 2 on the second network card 606b, and port 3 on the third network card 606c are no longer available.

While a few examples of the configuration of teaming of network cards and/or ports on one or more network cards through the network card teaming controller at block 404 of the method 400 have been provided above, those examples are not meant to be limiting, and one of skill in the art will recognize that a variety of other teaming configurations of network cards, ports, and/or combinations thereof will fall within the scope of the present disclosure.

Following the configuration of the teaming of the network card(s) at block 404, the method 400 then proceeds to block 406 where an operating system is provided. As discussed above, the memory system 204 is operable to receive instruction that, when executed by the processing system 202, cause the processing system 202 to provide an operating system. For example, a user or administrator may provide the operating system instructions on the memory system 204 in the process of deploying an operating system on the server IHS 200. As is known in the art, the deployment or provision of an operating system on an IHS typically requires setting up the operating system to operate based on the IHS components in that IHS. For example, an operating system may need to be configured based on network interface controllers in an IHS (e.g., the network cards 208a, 208b, and 208c in the server IHS 200.) Because of the teaming configurations provided through the hardware connections of the network card teaming controller 206 at block 404 of the method 400, along with the network card teaming controller 206 being provided between the operating system and the network cards 208a, 208b, and 208c, at block 406 the operating system is presented with those teaming configurations rather than the individual network cards 208a, 208b, and 208c.

Figure 12:
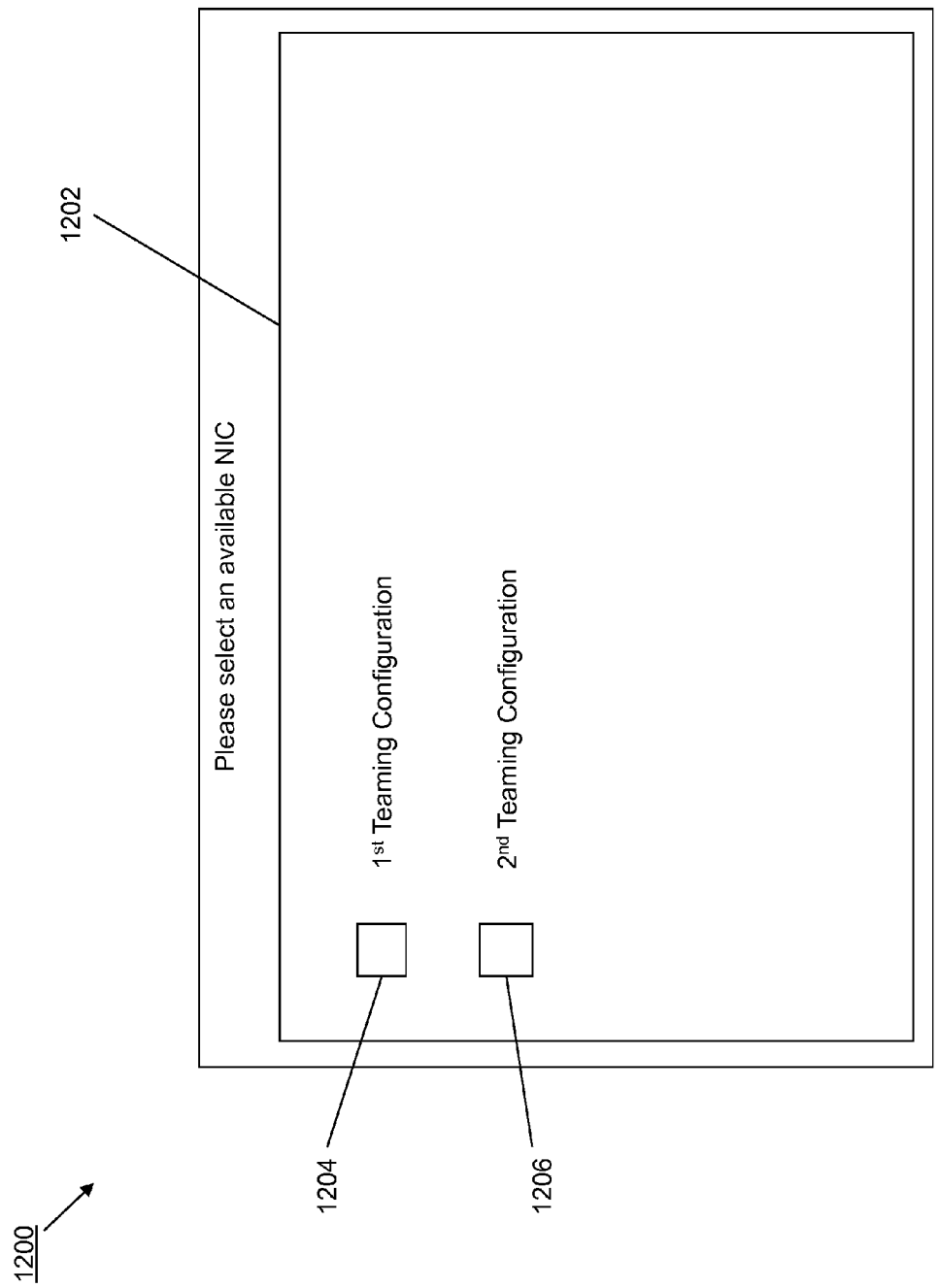
FIG. 12 is a screen shot illustrating an embodiment of an operating system configuration NIC selection screen.

For example, FIG. 12 illustrates a teaming configuration selection screen 1200 provided after a user or administrator has provided two different teaming configuration (e.g., a $1^{st}$ teaming configuration and a $2^{nd}$ teaming configuration) at block 404 of the method 400. The teaming configuration selection screen 1200 may be presented to a user or administrator during the deployment, installation, or setup of the operating system, and may include a teaming configuration selection window 1202 having a first teaming configuration selector 1204 and a second teaming configuration selector 1206. While not illustrated, the teaming configuration selection window 1202 may include details about each teaming configuration that may be selected (e.g., details about which network cards are teamed, which ports are teamed, and/or a variety of other teaming details known in the art.) The user may then select the first teaming configuration selector 1204 or the second teaming configuration selector 1206 depending on the desired teamed networking operating of the server IHS 200. As is known in the art, additional configuration activities may be conducted to configure the operating system such that it may operate on the IHS following block 406 of the method 400.

The method 400 then proceeds to block 408 where data is sent and received through the teamed network card(s) in response to communication between the operating system and the network card teaming controller. In an embodiment, the operation of the server IHS 200 at block 408 of the method 400 involves the operating system interacting with the network cards 208a, 208b, and 208c through communication directed by the configured hardware connections in the network card teaming controller 206. As discussed above, the network cards 208a, 208b, and 208c may not be visible to the operating system due to, for example, the network cards 208a, 208b, and 208c not being directly coupled to a motherboard that includes the operating system provisioning system, but being coupled to the network card teaming controller 206 that is coupled to that motherboard; being coupled directly to the motherboard that includes the operating system provisioning system but with the operating system not including a driver for communicating with the network cards 208a, 208b, and 208c; and/or in a variety of other manners known in the art. As such, the operating system only "sees" the teamed networking components of the server IHS 200 as presented to it by the network card teaming controller 206, i.e., the teaming configurations provided at block 404 of the method 400. Thus, when communicating over the network, data is sent from the operating system through a teamed network configuration presented to it by the network card teaming controller 206 (e.g., through communication between the operating system and the network card teaming controller 206), and that data is then forwarded from the network card teaming controller 206 to the appropriate network cards 208a, 208b, or 208c. Similarly, data is received by the network cards 208a, 208b, and 208c and forwarded to the network card teaming controller 206 (e.g., through communication between the network cards 208a, 208b, and 208c and network card teaming controller 206), and that data is then forwarded from the network card teaming controller 206 through a teamed network configuration to provides that data to the operating system.

Thus, systems and methods have been described that provide for hardware teaming of network cards and/or ports on one or more network cards in an IHS so that an operating system running on the IHS is presented with a teamed configuration rather than a plurality of network cards and ports that must be teamed through software. Such systems and methods relieve the operating system of the need for software that supports network connection teaming. Furthermore, operating system failures will not result in failure of high availability of network cards. The systems and method discussed herein ensure that data traffic is handled primarily at the hardware level, while at the operating system level, all that is seen is a hardware teamed configuration of network cards or ports.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network connection teaming system, comprising:
   an operating system (OS) provisioning system;
   at least one network interface controller (NIC) including a plurality of network connections;
   a NIC teaming controller that includes a circuit board having an OS provisioning system connection coupled to the OS provisioning system, and having at least one NIC connection coupled to the at least one NIC,
   wherein the circuit board includes a plurality of physical configurable hardware connections between the OS provisioning system connection and the at least one NIC connection, and wherein the NIC teaming controller configures the plurality of physical configurable hardware connections to:
      team, in hardware via the plurality of configured physical configurable hardware connections, any subset of the plurality of network connections included on the at least one NIC to provide at least one teamed network connection that presents that subset of the plurality of network connections as a single network connection to an OS provided by the OS provisioning system in order to allow the OS to interact with the at least one NIC,
   wherein the plurality of configured physical configurable hardware connections maintain the at least one teamed network connection in the event of:
      a failure of the at least one NIC; and
      a failure of the OS such that the at least one teamed network connection is not presented as the single network connection to any OS; and
   a cache that is coupled to the NIC teaming controller and that is configured to store a current data transmission such that, in response to a transmission failure, the current data transmission is re-transmitted upon correction of the transmission failure.

2. The system of claim 1, wherein the at least one NIC is not directly visible to the OS provided on the OS provisioning system.

3. The system of claim 2, wherein the OS provisioning system connection is directly connected to a motherboard that is coupled to the OS provisioning system, and the at least one NIC is not directly connected to the motherboard but coupled to the motherboard through the at least one NIC connection.

4. The system of claim 1, wherein the at least one NIC includes a first NIC including the plurality of network connections, and wherein the plurality of physical configurable hardware connections on the NIC teaming controller are configurable to team at least two network connections of the plurality of network connections on the first NIC in hardware such that the at least two network connections are presented to the OS provided on the OS provisioning system as a single network connection.

5. The system of claim 1, wherein the at least one NIC includes a plurality of NICs, each including the plurality of network connections, and wherein the plurality of physical configurable hardware connections on the NIC teaming controller are configurable to team the plurality of NICs in hardware such that the plurality of NICs are presented to the OS provided on the OS provisioning system as a single NIC with the plurality of network connections.

6. The system of claim 1, wherein the failure of the OS includes a loss of power to the OS provisioning system.

7. An information handling system (IHS), comprising:
   an IHS chassis;
   a processing system located in the IHS chassis;
   a memory system located in the IHS chassis and coupled to the processing system, wherein the memory system is configured to receive instruction that, when executed by the processing system, cause the processing system to provide an operating system (OS);
at least one network interface controller (NIC) including a plurality of network connections, located in the HIS chassis, and coupled to the processing system, wherein the at least one NIC is not directly visible to the OS provided by the processing system;
a NIC teaming controller that includes a circuit board having a processing system connection coupled to the processing system, and having at least one NIC connection coupled to the at least one NIC, wherein the circuit board includes a plurality of physical configurable hardware connections between the processing system connection and the at least one NIC connection, and wherein the NIC teaming controller configures the plurality of physical configurable hardware connections to:
team, in hardware via the plurality of configured physical configurable hardware connections, any subset of the plurality of network connections included on the at least one NIC to provide at least one teamed network connection that presents that subset of the plurality of network connections as a single network connection to the OS in order to allow the OS to interact with the at least one NIC,
wherein the plurality of configured physical configurable hardware connections maintain the at least one teamed network connection in the event of:
a failure of the at least one NIC; and
a failure of the OS such that the at least one teamed network connection is not presented as the single network connection to any OS; and
a cache that is coupled to the NIC teaming controller and that is configured to store a current data transmission such that, in response to a transmission failure, the current data transmission is re-transmitted upon correction of the transmission failure.

8. The IHS of claim 7, wherein the processing system connection is directly connected to a motherboard that is coupled to the processing system, and each at least one NIC is not directly connected to the motherboard but coupled to the motherboard through the at least one NIC connection.

9. The IHS of claim 7, wherein the at least one NIC is directly connected to a motherboard that is coupled to the processing system, but not directly visible to an operating system provided by the processing system because no driver is provided to the operating system for the at least one NIC.

10. The IHS of claim 7, wherein the at least one NIC includes a first NIC including the plurality of network connections, and wherein the plurality of physical configurable hardware connections on the NIC teaming controller are configurable to team at least two network connections of the plurality of network connections on the first NIC in hardware such that the at least two network connections are presented to an operating system provided by the processing system as a single network connection.

11. The HIS of claim 7, wherein the at least one NIC includes a plurality of NICs, each including the plurality of network connections, and wherein the plurality of physical configurable hardware connections on the NIC teaming controller are configurable to team the plurality of NICs in hardware such that the plurality of NICs are presented to an operating system provided by the processing system as a single NIC with the plurality of network connections.

12. The HIS of claim 7, wherein the failure of the OS includes a loss of power to the processing system.

13. A method for teaming network connections, comprising:
providing, by an operating system (OS) provisioning system that is coupled to an OS provisioning system connection on a circuit board in a NIC teaming controller, an OS;
configuring, in hardware on the NIC teaming controller, a plurality of physical configurable hardware connections that are included on the circuit board between the OS provisioning system connection and at least one NIC connection on the circuit board that is coupled to at least one NIC, wherein the plurality of configured physical configurable hardware connections operate to team any subset of a plurality of network connections included on the at least one NIC to provide at least one teamed network connections;
presenting the at least one teamed network connection as a single network connection to an OS provided by the OS provisioning system in order to allow the OS to interact with the at least one NIC;
maintaining, using the plurality of configured physical configurable hardware connections, the at least one teamed network connection in the event of:
a failure of the at least one NIC; and
a failure of the OS such that the at least one teamed network connection is not presented as the single network connection to any OS; and
storing, in a cache that is coupled to the NIC teaming controller, a current data transmission such that in response to a transmission failure the current data transmission is re-transmitted upon correction of the transmission failure.

14. The method of claim 13, wherein the at least one NIC is not directly visible to the OS provided on the OS provisioning system.

15. The method of claim 13, wherein the at least one NIC includes a first NIC including the plurality of network connections, and wherein the method includes:
configuring the plurality of physical configurable hardware connections included in the hardware on the NIC teaming controller to team at least two network connections of the plurality of network connections on the first NIC in hardware; and
presenting the at least two network connections by the NIC teaming controller to the OS provided on the OS provisioning system as a single network connection.

16. The method of claim 13, wherein that at least one NIC includes a plurality of NICs, each including the plurality of network connections, and wherein the method includes:
configuring the plurality of physical configurable hardware connections included in the hardware one the NIC teaming controller to team the plurality of NICs in hardware; and
presenting the plurality of NIDs by the NIC teaming controller to the OS provided on the OS provisioning system as a single NIC with the plurality of network connections.

17. The method of claim 13, wherein the failure of the OS includes a loss of power to the OS provisioning system.

* * * * *

UNITED STATES PATENT AND TRADEMARK OFFICE
CERTIFICATE OF CORRECTION

PATENT NO. : 9,838,342 B2
APPLICATION NO. : 13/895177
DATED : December 5, 2017
INVENTOR(S) : Umesh Sunnapu It is certified that error appears in the above-identified patent and that said Letters Patent is hereby corrected as shown below:

In the Claims

In Claim 7, Column 15, Line 4: please replace "HIS" with --IHS--;

In Claim 11, Column 15, Line 57: please replace "HIS" with --IHS--;

In Claim 12, Column 16, Line 1: please replace "HIS" with --IHS--;

In Claim 13, Column 16, Line 19: please replace "connections" with --connection--;

In Claim 16, Column 16, Line 51: please replace "that" with --the--;

In Claim 16, Column 16, Line 55: please replace "one" with --on--; and

In Claim 16, Column 16, Line 58: please replace "NIDs" with --NICs--.

Signed and Sealed this
Tenth Day of July, 2018

Andrei Iancu
*Director of the United States Patent and Trademark Office*